United States Patent [19]

Klinkenberg

[11] 4,197,938
[45] Apr. 15, 1980

[54] CONVEYOR FOR BULK MATERIALS

[75] Inventor: Willem P. Klinkenberg, Heiloo, Netherlands

[73] Assignee: Machinefabriek en Constructiewerkplaats Gebr. Klinkenberg B.V., Wormerveer, Netherlands

[21] Appl. No.: 637,023

[22] Filed: Dec. 2, 1975

[30] Foreign Application Priority Data

Dec. 3, 1974 [NL] Netherlands ......................... 7415762
Jul. 31, 1975 [NL] Netherlands ......................... 7509152

[51] Int. Cl.² ............................................. B65G 19/14
[52] U.S. Cl. .................................................... 198/716
[58] Field of Search ............... 198/116, 168, 206, 207, 198/643, 716, 699, 700, 719, 727, 729, 733; 187/3; 222/365; 417/320

[56] References Cited

U.S. PATENT DOCUMENTS

| | | | |
|---|---|---|---|
| 1,244,383 | 10/1917 | Snider | 198/168 X |
| 1,557,629 | 10/1925 | Taylor | 198/168 |
| 2,110,204 | 3/1938 | Davis | 198/168 |
| 2,311,084 | 2/1943 | Redler | 198/206 X |
| 2,767,825 | 10/1956 | Welch | 198/168 |
| 3,435,964 | 4/1964 | Wilkin | 198/168 X |

FOREIGN PATENT DOCUMENTS 15827 of 1889 United Kingdom ..................... 198/716

*Primary Examiner*—Robert B. Reeves
*Assistant Examiner*—Douglas D. Watts
*Attorney, Agent, or Firm*—Ernest A. Beutler

[57] ABSTRACT

A conveyor for bulk materials comprised of an endless cable to which a plurality of disk-shaped elements are fixed at equal spacing, a sprocket type drive wheel for driving the cable and affixed disks and a duct for receiving at least a portion of the driven cable and disks. The duct has a cross-sectional shape complementary to the disks and forms a track way along which the material may be transported. The disks have a trapezoidal cross-sectional configuration whereby they have a smaller modulus of elasticity in the plane of their faces than in the perpendicular direction for ready deflection of the periphery thereof for release of particles of material jammed between the disk and the duct. The sprocket drive wheel has a plurality of recesses for receiving the disks and intermediate bearing surfaces for guiding and engaging the cable. The radius of curvature of the bearing surfaces is smaller than the radius of the drive wheel for confining the area of bending of the cable to that portion which is positioned between and away from the disks. The bearing surfaces also have no grooves and the cable is retained on them by radially projecting elements provided at the sides of the bearing surfaces.

6 Claims, 3 Drawing Figures

CONVEYOR FOR BULK MATERIALS

The invention relates to a conveyor for bulk materials, comprising at least one endless cable passed around at least two spaced apart guiding means, with a plurality of disc-like elements of a relatively flexible material such as a plastic material, which at their centres and at equal spacings are fixed on this cable by means of a clamping element, at least one of the guiding means being formed by a sprocket type drive wheel to carry the cable with the disc-like elements fixed thereto into a revolving movement and at least one of the straight tracks of the cable being enveloped by a duct or pipe, which in cross-sectional view has an inside circumference of in fact that the same shape as the circumference of the discs and has such dimensions that the discs are permitted to slide through the duct or pipe with a small clearance to form a trackway along which the material is conveyed, whereas at the one guiding means, means for introducing and at the other guiding means, means for receiving the material to be conveyed are located. Such a device is known from French Pat. No. 1,342,683.

In the known conveyor the clearance between the discs and the duct or pipe is adapted to the particle size of the material to be conveyed the arrangement being such, that the particles are allowed to escape freely between the discs and the inside circumference of the duct or pipe, so that during operation of the apparatus they can not become jammed in the clearance. Because of this, however, the efficiency of the apparatus is unfavourably affected.

Furthermore, in the known device the sprocket type drive wheel is of a true circular wheel construction with a plurality of recesses equally spaced apart over its circumference, so that the cable portions which span the recesses are highly bent at the transitions into the circumferential part forming the bearing surface, also at the very locations where the straight restrained cable portions extend out of the clamping element, resulting into easily snapping of the cable at these locations.

Finally, the known sprocket type drive wheel is provided with a circumferential groove for guiding the cable, because of which the known device is not suited for conveying powdered material, in as much as this circumferential groove will be quickly filled by this material resulting into the cable running off the sprocket type drive wheel.

The object of the invention is to provide a conveyor of the type preferred to, which does not present these disadvantages.

A further object of the invention is to provide a conveyor of the type referred to, which is self-loading. This object is achieved by the conveyor according to the invention in which the construction of the discs is such that the elasticity modulus perpendicular to the disc is larger than in the plane of the discs.

In this way the clearance between the discs and the inner wall of the duct or pipe can be very small, so that the particles of the material to be conveyed can not pass freely through the clearance, while still no jamming of the particles will occur, since because of the small elasticity modulus in the plane of the disc a particle, which tends to become jammed, is immediately released again.

This can be explained as follows:

Suppose that a particle with diameter k, an elasticity modulus $E_k$, a spring constant in the direction of the diameter $c_k$ and a spring constant in axial direction $c_2$ is jammed between the duct or pipe with a diameter D and a disc with diameter s, an elasticity modulus $E_s$, a spring constant in the direction of the diameter $c_s$ and a spring constant in axial direction $c_1$, than in neglecting the transverse contraction in tangential direction the following equation applies:

$$\Delta s + \Delta k = -\frac{l_s}{E_2} \cdot \frac{F}{A_2} + \gamma_1 \frac{l_s}{E_s} \cdot \frac{W}{A_1} - \frac{l_k}{E_s} \cdot \frac{F}{A_k} + \gamma_2 \frac{l_k}{E_k} \cdot \frac{W}{A_2}$$

in which:
l = spring length
F = force
A = surface
$W = f_o F$ = frictional force
$\gamma$ = transverse contraction coefficient $$\Delta s + \Delta k = -\frac{F}{c_s} + \frac{\gamma_1}{c_1} f_o F - \frac{F}{c_k} + \frac{\gamma_2}{c_2} f_o F$$

$$\Delta s + \Delta k = -F\left[\left(\frac{1}{c_s} + \frac{1}{c_k}\right) - f_o\left(\frac{\gamma_1}{c_1} + \frac{\gamma_2}{c_2}\right)\right]$$

$W = f_o F$ should be as small as possible, this is obtained when $c_s$ and $c_k$ and consequently also the elasticity moduli of both the disc and the grain in the direction of the diameter are very small and the elasticity constants $c_1$ and $c_2$ of the disc and the grain respectively in the longitudinal direction of the duct or pipe are very large.

Preferably the discs in cross-section have the shape of an isosceles trapezoid.

In order to prevent the cable from snapping easily, the circumferential bearing surface of the sprocket type drive wheel according to the invention has at least in the centre between each two recesses a radius of curvature which is smaller than the radius of the sprocket type drive wheel.

Because of this, the locations of heaviest bending of the cable portion running over and around the sprocket type drive wheel are shifted from the transition of recess to bearing surface to the centre part of the bearing surface between two recesses, and thus the straight restrained cable portion runs substantially straight on from the clamping element to the centre part.

In addition thereto the bearing surface of the sprocket type drive wheel is smooth, whereas viewed in the direction of rotation at least near the rear side of each recess a number of radially projecting elements is provided at both sides of the bearing surface.

Conveniently a conveyor according to the invention can be made self-loading in that both straight tracks are enveloped by a duct or pipe while the other guiding means is formed by a bend piece interconnecting said duct or pipe at their lower ends and of which a part of its outer wall having the largest radius of curvature is cut away.

The invention will now be described in more detail with reference to the attached drawing in which.

Figure 1:
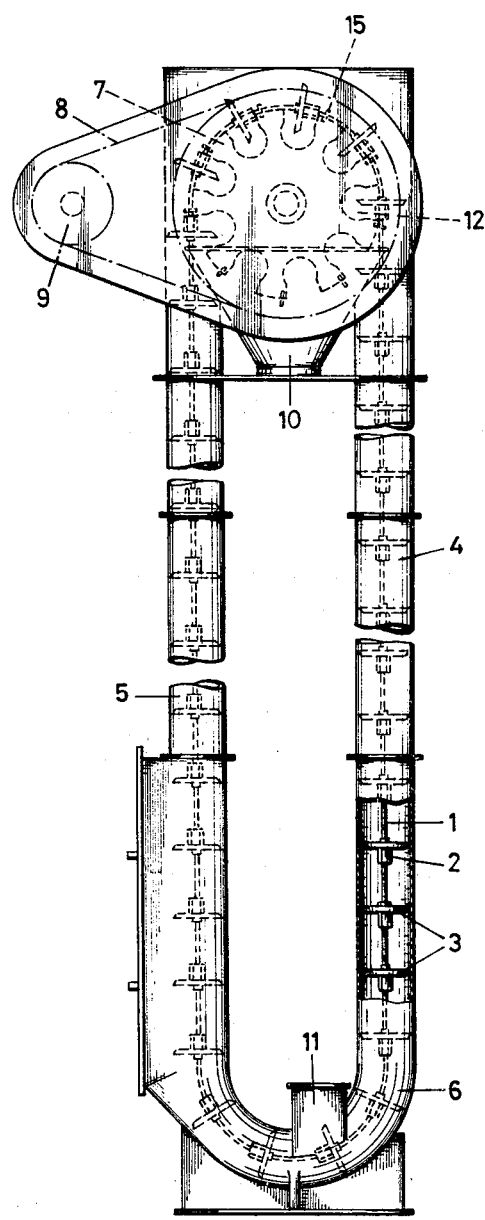
FIG. 1 shows a side view of an apparatus according to the invention, in which a portion of the duct or pipe is cut away.

As shown in FIG. 1 the apparatus according to the invention comprises an endless cable 1 with a plurality of discs 3 fixed on the cable at equal spacings by means of clamping elements 2.

The discs 3 in cross-sectional view have the shape of an isosceles trapezium, by which it is attained that the elasticity modulus perpendicular to the disc is larger than in the plane of the disc.

Figure 2:
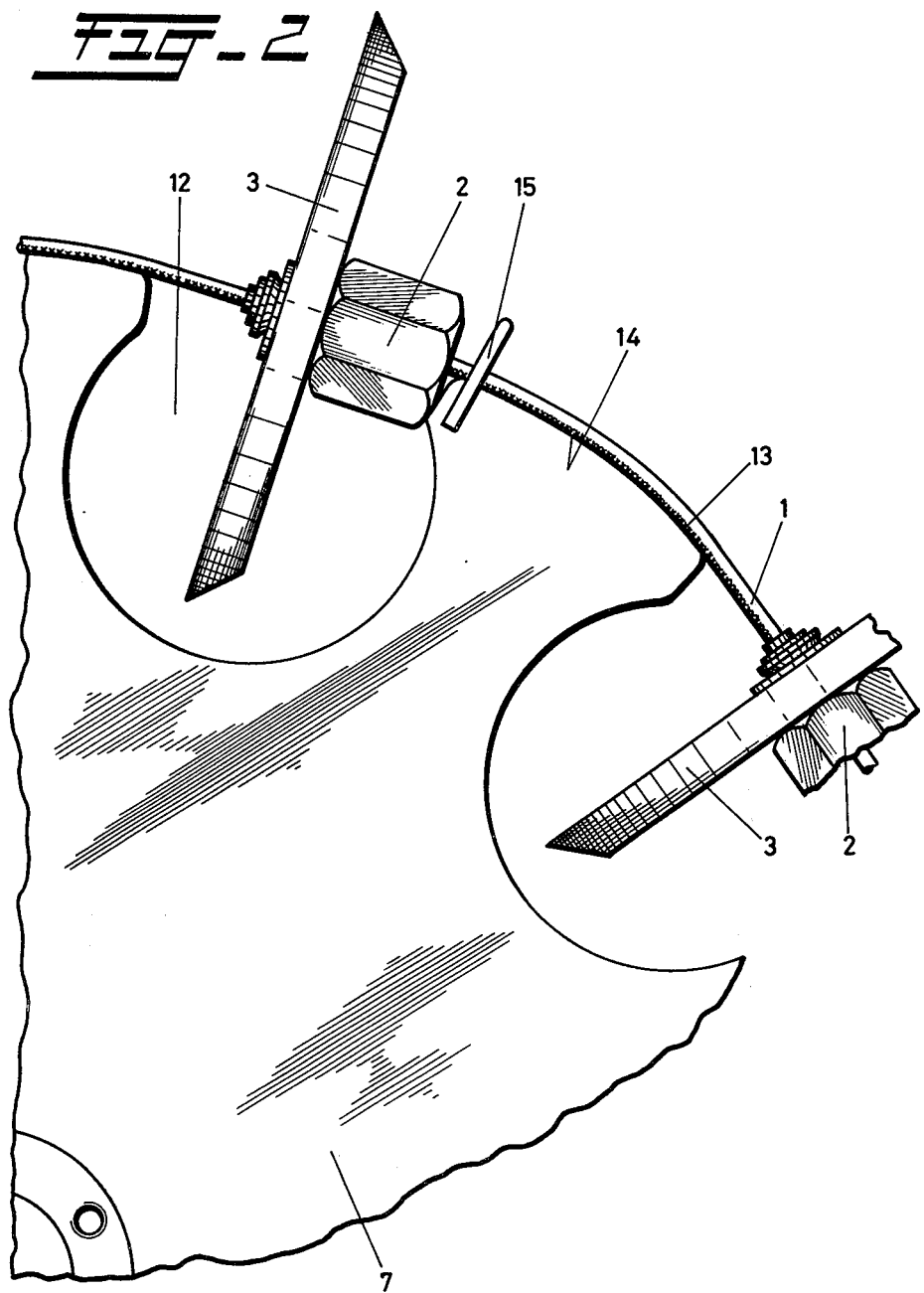
FIG. 2 shows on an enlarged scale a part of the sprocket type drive wheel.

Around the straight track of the cable 1, shown on the right hand side in FIG. 2, a duct or pipe 4 is provided, for defining the trackway along which the transport of material is taking place.

The straight track of the cable 1 shown on the left hand side is also enveloped by a duct or pipe 5, whereas the ducts or pipes 4 and 5 at the lower end are connected with each other by a bend piece 6 which forms the one guiding means. The other guiding means is formed by the sprocket type drive wheel 7, which can be rotated through the driving chain 8 by the driving motor 9. Underneath the sprocket type drive wheel 7 a receptacle 10 is provided for the material raised, whereas an inlet 11 is provided at the bend piece 6.

As more clearly shown in FIG. 2, the sprocket type drive wheel 7 has at equal spacings a plurality of recesses 12, while the bearing surfaces 13 located between these recesses are smooth.

The central parts 14 of the bearing surface 13 between the recesses 12 have a radius of curvature which is smaller than the radius of the sprocket type drive wheel 7, so that the portions of the cable 1 spanning the recesses 12 run almost straight at both sides of the recesses and the heaviest bending of the cable occurs at the positions 14, so that the cable portions clamped straight in the clamping elements 2 travel straight on in emerging from these clamping elements and are not subjected to bending at the exit of the clamping elements.

In order to prevent the cable 1 from running off the sprocket type drive wheel 7, pairs of radially projecting pin-shaped elements 15 are provided at both sides of the trackway 13 and near the rear side of the recess as viewed in the direction of rotation of the disc 7, in order to prevent that the clamping element 2 runs upon the bearing surface 13. The pins 15 of each pair in FIG. 2 are opposite to each other, but they can also be located in staggered positions in the circumferential direction.

Figure 3:
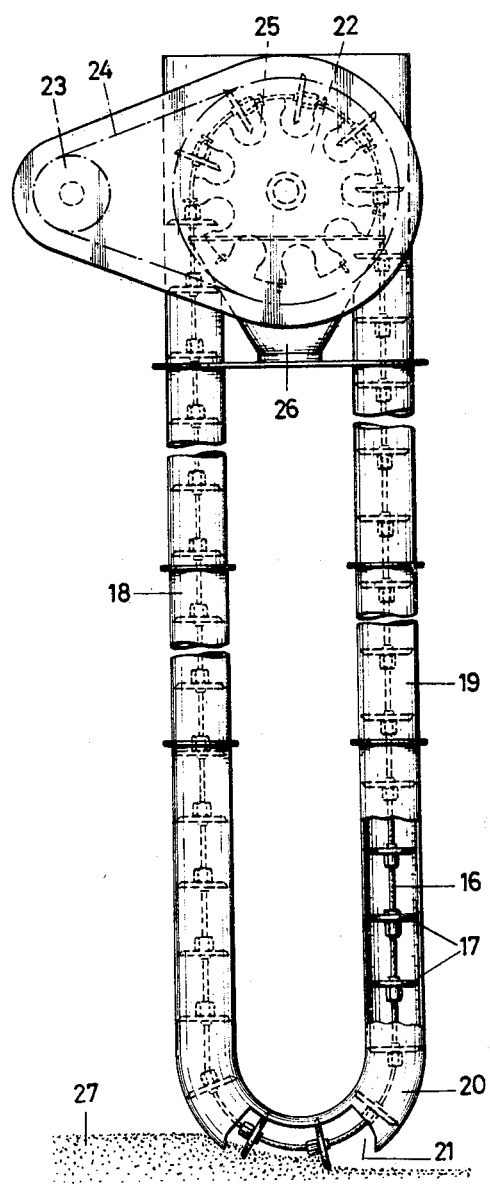
FIG. 3 shows in side elevation an apparatus according to the invention, which is self-loading.

In FIG. 3 is shown an apparatus according to the invention which is self-loading.

The apparatus comprises an endless cable 16 on which at equal spacings a plurality of discs 17 is fixed.

The cable 16 with the discs 17 fixed thereto passes through a tube consisting of vertically extending pipe portions 18 and 19 and a bend piece 20 interconnecting these portions. Part of the outer wall with the largest radius of curvature of the bend piece 20 is cut away, so that in this outer wall an aperture 21 is formed.

The inside diameter of the pipe portions 18 and 19 and the bend piece 20 is approximately equal to the diameter of the discs 17, so that the discs can slide through the pipe with a slight clearance.

Above the open upper ends of the pipe portions 18 and 19 a sprocket type drive wheel 22 is rotatably mounted, which can be driven by a motor 23 through the driving chain 24. The recesses 25 in the circumference of the sprocket type drive wheel are adapted for accommodating the discs 17 and engaging the trailing sides of these discs. Underneath the sprocket type drive wheel 22 an outlet nozzle 26 is located.

During operation the apparatus is put into position over the material to be transferred 27 by means which are not shown, and this in such a way that the aperture 21 in the bend piece 20 penetrates into the material, so that the travelling discs 17 can carry along portions of the material and raise these through the one vertically extending pipe portion 18 into the outlet nozzle 26.

I claim:

1. In a conveyor for bulk materials comprising an endless cable, a plurality of disk-like elements fixed at equal spacings to said cable by means of respective clamping elements, a sprocket type drive wheel for driving said cable and said disk-like elements, said sprocket type drive wheel being formed with a plurality of circumferentially spaced recesses adapted to receive said disks and intermediate bearing surfaces, said bearing surfaces having a radius of curvature that is less than the radius of said sprocket type drive wheel whereby the bending of said cable is substantially confined to the area thereof between and spaced from said disks, a duct positioned at one side of said drive wheel and adapted to receive a portion of the length of said cable, said duct having a cross-sectional configuration complementary in shape to the cross-section of said disk-like elements and receiving said disk-like elements with a slight clearance for forming a track way along which material may be conveyed, the improvement comprising said disks being formed from a relatively flexible material having a cross-sectional shape of an isosceles trapezium whereby the modulus of elasticity thereof is greater in direction perpendicular to the disk than in the plane of the disk for facilitating deflection of the periphery of the disk to free particles of material trapped between the periphery of the disk and said duct.

2. A conveyor as set forth in claim 1 wherein the bearing surfaces of the sprocket type drive wheel are substantially smooth and without grooves therein.

3. A conveyor as set forth in claim 2 further including radially projecting elements fixed to the sprocket type drive wheel on opposite sides of said bearing surfaces for maintaining said cable in engagement with said bearing surfaces.

4. In a conveyor for bulk materials comprising an endless cable, a plurality of disk-like elements fixed at equal spacings to said cable by means of respective clamping elements, a sprocket type drive wheel for driving said cable and said disk-like elements, a duct positioned at one side of said drive wheel and adapted to receive a portion of the length of said cable, said duct having a cross-sectional configuration complementary in shape to the cross-section of said disk-like elements and receiving said disk-like elements with a slight clearance for forming a track way along which material may be conveyed, the improvement comprising said sprocket type drive wheel being comprised of a plurality of circumferentially spaced recesses for receiving said disks and circumferentially spaced bearing surfaces defined between said recesses, said bearing surfaces having a radius of curvature that is less than the radius of said sprocket type drive wheel whereby the bending of said cable is substantially confined to the area thereof between and spaced from said disks.

5. A conveyor as set forth in claim 4 wherein the bearing surfaces of the sprocket type drive wheel are substantially smooth and without grooves therein.

6. A conveyor as set forth in claim 5 further including radially projecting elements fixed to the sprocket type drive wheel on opposite sides of said bearing surfaces for maintaining said cable in engagement with said bearing surfaces.

* * * * *

UNITED STATES PATENT AND TRADEMARK OFFICE
CERTIFICATE OF CORRECTION

PATENT NO. : 4,197,938
DATED : April 15, 1980
INVENTOR(S) : Willem P. Klinkenberg It is certified that error appears in the above-identified patent and that said Letters Patent are hereby corrected as shown below:

Column 1, line 16, "that" should be omitted; Column 2, line 9, that portion of the equation shown as " $-\frac{I_s}{E_2} \cdot \frac{F}{A_2} +$ " should be --- $-\frac{I_s}{E_s} \cdot \frac{F}{A_s} +$ ---; Column 3, line 6, "trapezium" should be ---trapezoid---.

Signed and Sealed this

Twenty-ninth Day of July 1980

[SEAL]

Attest:

SIDNEY A. DIAMOND

Attesting Officer

Commissioner of Patents and Trademarks